US011461151B2

(12) United States Patent
Sonnelitter, III et al.

(10) Patent No.: US 11,461,151 B2
(45) Date of Patent: *Oct. 4, 2022

(54) CONTROLLER ADDRESS CONTENTION ASSUMPTION

(71) Applicant: International Business Machines Corporation, Armonk, NY (US)

(72) Inventors: Robert J. Sonnelitter, III, Mount Vernon, NJ (US); Michael Fee, Cold Spring, NY (US); Craig R. Walters, Highland, NY (US); Arthur O'Neill, Poughkeepsie, NY (US); Matthias Klein, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,167

(22) Filed: Apr. 22, 2021

(65) Prior Publication Data

US 2021/0240548 A1 Aug. 5, 2021

Related U.S. Application Data

(63) Continuation of application No. 16/527,424, filed on Jul. 31, 2019, now Pat. No. 11,010,210.

(51) Int. Cl.
*G06F 9/52* (2006.01)
*G06F 9/48* (2006.01)
(Continued)

(52) U.S. Cl.
CPC ............ *G06F 9/528* (2013.01); *G06F 9/3802* (2013.01); *G06F 9/4881* (2013.01); *G06F 9/544* (2013.01); *G06F 12/0802* (2013.01)

(58) Field of Classification Search
None
See application file for complete search history.

(56) References Cited

U.S. PATENT DOCUMENTS

| 4,916,604 A * | 4/1990 | Yamamoto .......... G06F 12/0857 |
| | | 711/E12.05 |
| 6,516,393 B1 * | 2/2003 | Fee ..................... G06F 13/1663 |
| | | 711/150 |

(Continued)

OTHER PUBLICATIONS

Anonymously; "Implementing Locks in a Shared-Memory Multi-processor Using a Simplified Coherence Protocol" ip.com: Sep. 24, 2010. pp. 6.

(Continued)

*Primary Examiner* — Yaima Rigol
(74) *Attorney, Agent, or Firm* — Cantor Colburn LLP; Jeffrey Ingalls

(57) ABSTRACT

Embodiments of the present invention are directed to a computer-implemented method for controller address contention assumption. A non-limiting example computer-implemented method includes a shared controller receiving a fetch request for data from a first requesting agent, the receiving via at least one intermediary controller. The shared controller performs an address compare using a memory address of the data. In response to the memory address matching a memory address stored in the shared controller, the shared controller acknowledges the at least one intermediary controller's fetch request, wherein upon acknowledgement, the at least one intermediary controller resets, wherein the acknowledging comprises exchanging tokens by the shared controller and the at least one intermediary controller, wherein the at least one intermediary controller transmits an identity of the first requesting agent and a type of operation associated with the requested data, and wherein the shared controller transmits an acceptance.

20 Claims, 6 Drawing Sheets

(51) Int. Cl.
*G06F 12/0802* (2016.01)
*G06F 9/54* (2006.01)
*G06F 9/38* (2018.01)

(56) References Cited

U.S. PATENT DOCUMENTS

| | | |
|---|---|---|
| 7,644,237 B1 * | 1/2010 | Petersen ............ G06F 12/0831 711/146 |
| 9,086,974 B2 | 7/2015 | Busaba et al. |
| 2001/0010066 A1 | 7/2001 | Chin et al. |
| 2003/0159001 A1 | 8/2003 | Chalmer et al. |
| 2009/0049264 A1 | 2/2009 | Resnick |
| 2016/0147661 A1 | 5/2016 | Ambroladze et al. |
| 2017/0090977 A1 | 3/2017 | Bradbury et al. |
| 2018/0011765 A1 | 1/2018 | Bradbury et al. |
| 2018/0107505 A1 * | 4/2018 | Cain, III ............ G06F 12/0862 |
| 2021/0034438 A1 | 7/2021 | Sonnelitter et al. |

OTHER PUBLICATIONS

Anonymously; "Methods to Minimize Data Contention in a Cluster Database System" ip.com: Aug. 17, 2011. pp. 6.
List of IBM Patents or Patent Applications Treated as Related; Date Filed: Apr. 22, 2021, 2 pages.
Michael, MM. et al.; "Coherence Controller Architectures for SMP-Based CC-NUMA Multiprocessors" Google: 1997. pp. 10.
Ramos, S. et al.; "Modeling Communication in Cache-Coherent SMP Systems—A Case-Study with Xeon Phi", Google: Jun. 2013. pp. 12.

* cited by examiner

CONTROLLER ADDRESS CONTENTION ASSUMPTION

BACKGROUND

The present invention generally relates to cache management in a symmetric multiprocessing (SMP) system, and more specifically, to controller address contention assumption.

Modern processor chips continue to hold increased numbers of central processing unit (CPU) cores. As a result, the number of CPU cores connected to a shared cache and memory continues to also increase to the support growing workload capacity demand. The increasing number of CPUs cooperating to process the same workloads puts a significant burden on cache hierarchy design. Multiple CPU cores requesting data from the same memory address in a shared memory leads to address contention. These address contention events lead to inefficient computing and latency issues due to system serialization effects.

SUMMARY

Embodiments of the present invention are directed to controller address contention assumption. A non-limiting example computer-implemented method includes a shared controller receiving a fetch request for data from a first requesting agent, the receiving via at least one intermediary controller. The shared controller performs an address compare using a memory address of the data. In response to the memory address matching a memory address stored in the shared controller, the shared controller acknowledges the at least one intermediary controller's fetch request, wherein the acknowledging comprises exchanging tokens by the shared controller and the at least one intermediary controller, wherein the at least one intermediary controller transmits an identity of the first requesting agent and a type of operation associated with the requested data, and wherein the shared controller transmits an acceptance.

Other embodiments of the present invention implement the features of the above-described methods in computer systems and in computer program products.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
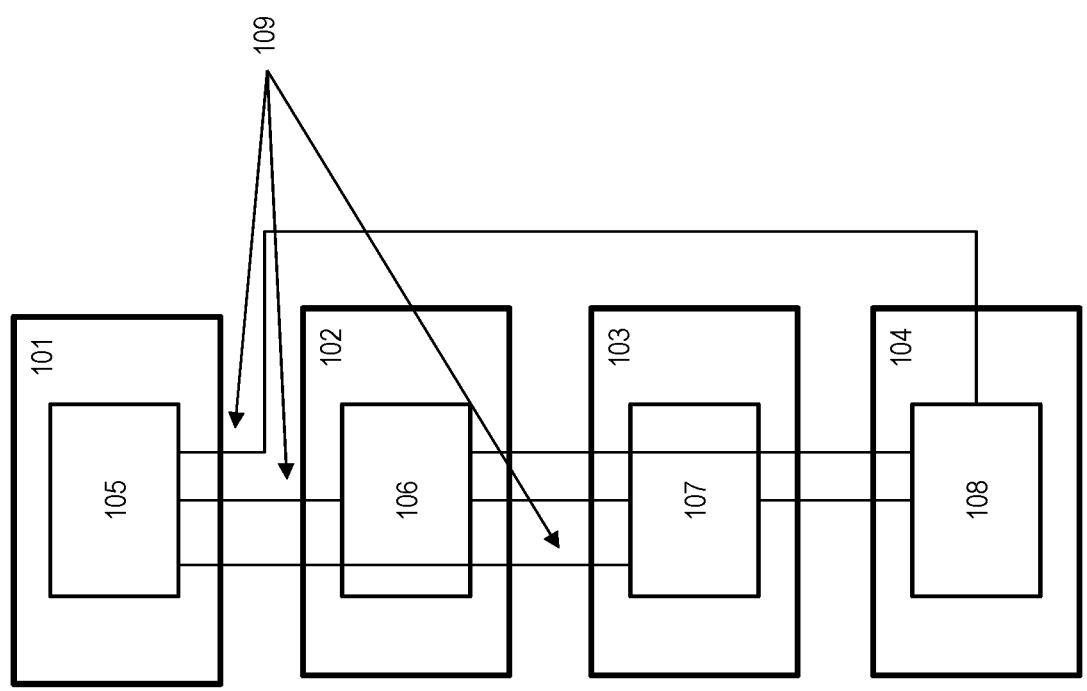
FIG. 1 depicts a block diagram of a unit of processing drawers for use in implementing one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide a shared resource of a symmetric multiprocessing (SMP) system that manages secondary requests for shared data and intelligently manages data return. This relieves the secondary requestors from individually managing data requests and permits them to execute new instructions. Furthermore, the shared resource is in a position to manage data returns based on the aggregate information received from the secondary requestors. This improves resource utilization, processor stall times, and system latency.

Applications executed on modern SMP system hardware necessitate data sharing among the multiple threads. Periodically, multiple processing cores request data from the same address of a shared memory storage. These address contention events diminish SMP performance by introducing latencies, increased executions times, and inefficient use of resources. Various mechanisms have been used to manage address contention events including locks, semaphores, mutexes, and queues. Conventionally, developers employ these mechanisms to design cache hierarchies that manage address contention events through various techniques including request serialization, and request reordering. However, these approaches introduce their own system performance inefficiencies in the form of increased controller utilization, inefficient use of bus/interface bandwidth, and introduction of additional operational latency.

In particular, an SMP system architecture is designed to have multiple processor cores that are in operable communication with respective intermediary controllers for loading and storing data from and to shared memory. Multiple intermediary controllers are in operable communication with multiple shared controllers for managing data requests from shared memory to multiple processor cores. In conventional systems, processor core requests are arbitrated and presented to a memory architecture that serializes data returns. The processor core's request moves through the architecture and initiates a cache-access and associated directory lookup, checks resource availability, and checks if any other request has the locked the same memory address. If the cache line has no owner, the current requester assumes ownership of the data and sets a lock to prevent other processors from accessing the data. This lock remains active until the request has been satisfied. As a subsequent processor (secondary requestor) requests data from higher level memory, its associated intermediary controller performs an address compare to determine if another processor is currently accessing the data or if another processor is ahead in line for the data. The intermediary controllers essentially form a linked list that forms an order that the data is to be returned.

During, the time that the current requester assumes ownership of the data, each secondary requester is locked out of the data until the current owner's request has been satisfied. The secondary requesters hold the requested memory addresses in a register and perform address compares to determine if the address remains locked. The secondary requestors remain on hold until the data is released. In these conventional systems, the secondary requestors only transmit and receive data in relation to their own requests. Additionally, the shared controller is unaware which processing cores are requesting the data and the operation types of the requests. This decentralized method of managing address contention events increases operational latencies and reduces efficient resource utilization.

One or more embodiments of the present invention address one or more of the above-described shortcomings by providing a shared resource that manages secondary requests and intelligently manages data returns to multiple processors. To facilitate an efficient processing of contended cache lines, a first controller on a processing node assumes ownership of all requests including the primary request and all secondary requests within the domain of the first controller. The first controller maintains a stack of vectors that identify each secondary requestor and the operation types of each request to manage the responses to each outstanding request. As such, the first controller assumes ownership and the secondary requestors are not responsible to continuously monitor the data availability. Therefore, the intermediary controllers are free to reset and address new instructions from a processor. Additionally, as the first controller is aware of the different operation types for the data, it can intelligently manage the data return to the secondary requestors to improve the SMP processing efficiency.

FIG. 1 depicts a system 100 of four interconnected processing units or drawers 101, 102, 103, 104 in accordance with one or more embodiments of the present invention. Although FIG. 1 depicts a system of four interconnected processing units or drawers, it should be appreciated that in other embodiments a system could include any number of processing units or drawers. Processor drawer 101 connects to drawer 102, drawer 103, and drawer 104 via a storage controller (SC) chip 105. The other processor drawers 102, 103, 104 each include a respective SC chip 106, 107, 108. The SC chips connect to each other via bus lines 109. Intra-drawer communication is achieved by receiving and transmitting signals via a combination of these bus lines 109.

Figure 2:
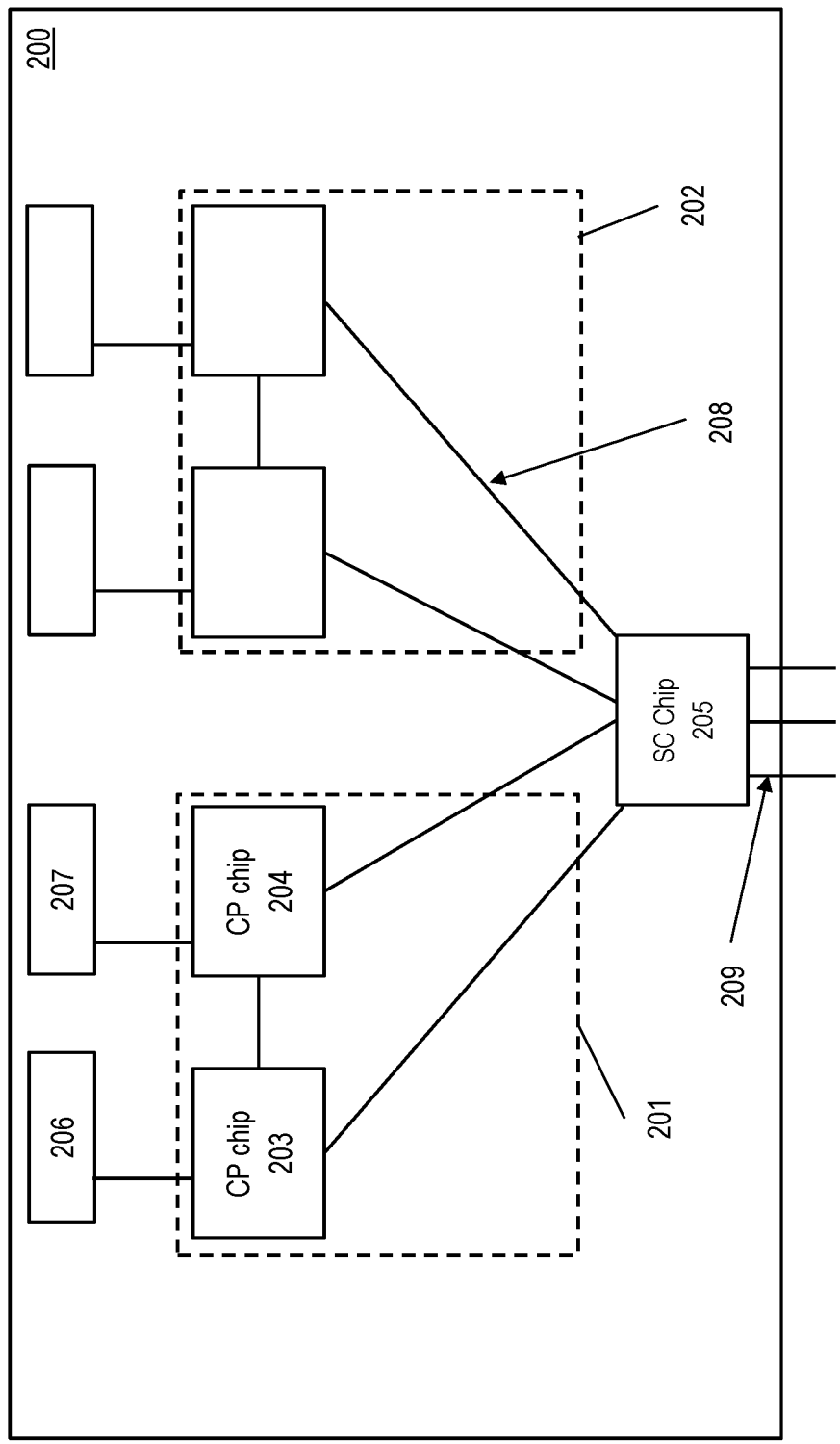
FIG. 2 depicts a block diagram of a processing drawer for use in implementing one or more embodiments of the present invention.

FIG. 2 depicts a processor drawer 200 including any one of the processor drawers 101, 102, 103, 104 shown in FIG. 1, according to one or more embodiments of the present invention. Referring now to FIG. 2, the processor drawer 200 includes two central processor (CP) clusters 201, 202. Each cluster 201, 202 includes two CP chips operatively connected to an SC chip 205 and each other within the respective cluster. For example, CP cluster 201 includes two CP chips 203, 204 operatively connected to each other and an SC chip 205. The SC chip 205 includes L4 cache (not shown), an inclusive memory or victim cache that is connected to multiple CP chips and the L3 cache (not shown) of each CP chip. Each CP chip 203, 204 within a cluster 201, 202 connects to system memory 206, 207. As seen in FIG. 2, CP cluster 201 is operatively connected with another CP cluster 202 via bus lines 208 through the storage controller 205. The processor drawer 200 is connected to other drawers via bus lines 209. Although the processor drawer 200 seen in FIG. 2 includes two CP clusters with each having two CP chips, it should be appreciated that in other embodiments a drawer includes any number of CP clusters that each include any number of CP chips that are used to execute any functionally as described herein.

The SC chip 205 is a logic circuit that manages cache memory and provides an interface between processors, caches, and main memory. Although FIG. 2 shows the SC chip 205 is external to the CP chips 203 204, SC chips can be integrated directly into the CP chips. The SC chips incorporate an L4 cache memory that is shared by each of the CP chips in a respective processor drawer 101, 102, 103, 104.

Figure 3:
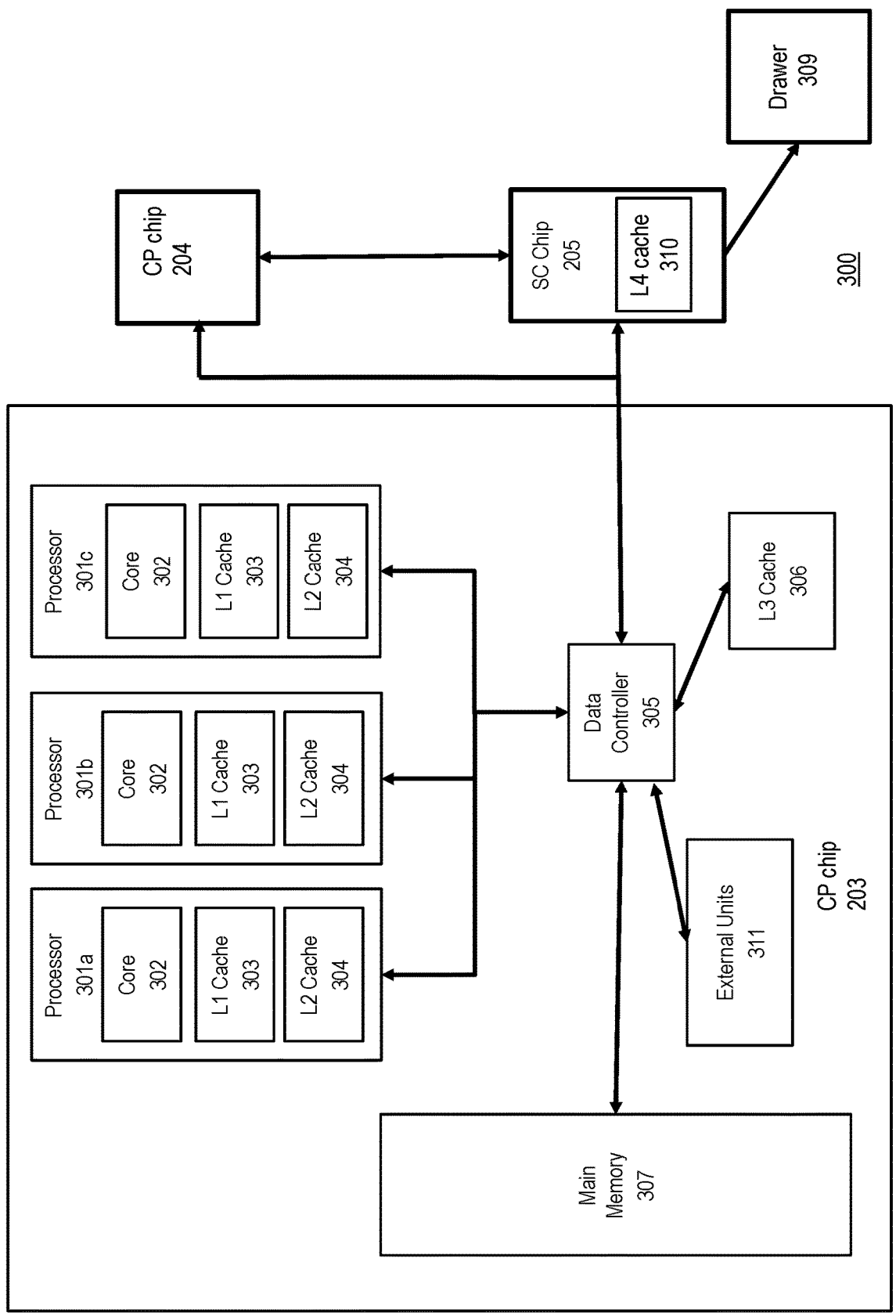
FIG. 3 depicts a block diagram of a computer system for use in implementing one or more embodiments of the present invention.

Referring to FIG. 3 a block diagram illustrating an exemplary symmetric multiprocessor (SMP) computer system 300 is shown. Although only one CP cluster is shown in FIG. 3, it should be appreciated that an SMP system 300 typically includes multiple CP clusters. In FIG. 3, one CP chip 203 has been expanded to provide further detail. As described above, each CP cluster includes multiple CP chips. For illustration purposes, the CP clusters 201, 202 as shown in FIG. 2 include two CP chips. However, as suggested earlier, a CP cluster includes any number of CPs to execute its desired functionality. As illustrated, the expanded CP chip 203 includes three processors 301a, 301b, 301c, but can include fewer or additional processors. Each processor includes one or more cores 302, a level 1 (L1) cache 303, and a level 2 (L2) cache 304. Each processor 301a, 301b, 301c is configured to be in operative communication with a data controller 305. The data controller 305 is configured to access data from the level 3 (L3) cache 306 and the level 4 (L4) cache 310. The data controller is in operable communication with an SC chip 205. As described above, the SC chip 205 is a logic circuit that manages cache memory and provides an interface between processors, caches, and main memory 307.

Main memory 307 includes physical memory storage that is internal to the computer. Main memory 307 is sometimes be referred to as random access memory (RAM) or primary storage. The main memory 307 provides storage for program instructions and data for execution and fetching during data processing. Program instructions and data contained on external sources, for example, discs, flash drives, and USB sticks are copied onto main memory 307 prior to execution.

The L1 cache 303, L2 cache 304, L3 cache 306, and L4 cache 310 are hierarchical levels of memory storage. The L1 cache 303 is the smallest cache and is located closest to the processor core 302. In some embodiments, the L1 cache is split between a data cache and an instructions cache. The L2 cache 304 is larger than the L1 cache and located the second closest to the processor core 302. In some embodiments, the L1 cache 303 and L2 cache 304 can employ an inclusive design and store duplicated data from one cache onto the other cache. In other embodiments, the L1 and L2 caches 303, 304 employ an exclusive design and not share any data. Generally, the L2 cache is not split and is a resource for the L1 cache. As depicted in FIG. 3, the L1 cache 303 and the L2 cache 304 are located on the CP chip 203. In older systems, the L2 cache 304 would have generally been found off the chip. The L1 cache 303 and the L2 cache 304 are exclusive to a respective processor core 302.

On the other hand, the L3 cache 306 is a shared cache and provides memory storage for CP chip 203. It should be appreciated the L3 cache 304 is configured to provide storage for any number of CP chips and any number of processor cores that are attached to its data controller 305. In conventional systems, the L3 cache is usually assigned to a set of processor cores. The L4 cache 310 is an inclusive cache or victim cache that is in operable connection with multiple L3 caches 304 and as a result, each of the processor cores that the respective L3 caches 304 are servicing. Therefore, the L4 caches 310 are required to manage large amounts of instructions and data between each of the processor cores. The external units 311 provides an interface to communicate using a technology such as PCIe, Universal Serial Bus (USB), PS/2, BLUETOOTH, infrared, serial port, internet, parallel port, and/or other appropriate technology. The external units 311 for example, receive input data from an input device such as other compute systems, DASD, a keyboard, a mouse, a trackball, a touch screen, a touch pad, a stylus pad, and/or other device. Alternatively and/or additionally, the external units 311 communicate output data.

Figure 4:
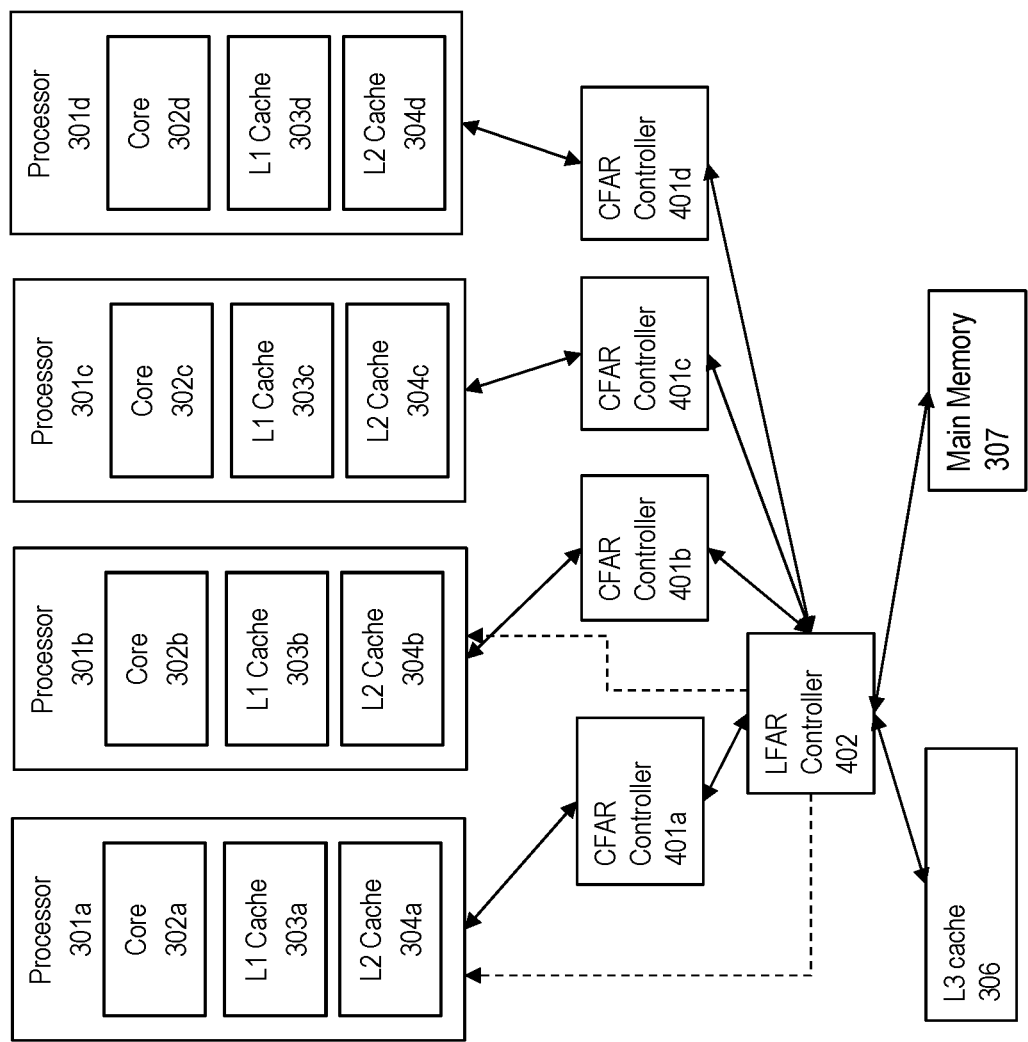
FIG. 4 depicts a flow diagram of a method for controller address contention assumption according to one or more embodiments of the invention.

Referring to FIG. 4 a block diagram illustrating an exemplary symmetric multiprocessor (SMP) computer system 300 is shown. As illustrated, four processors 301a, 301b, 301c, 301d are shown, that respectively include one or more cores 302, a level 1 (L1) cache 303, and a level 2 (L2) cache 304. Each processor 301a, 301b, 301c is configured to be in operative communication with the data controller 305. As described above, the data controller 305 is configured to access data from the level 3 (L3) cache 306 and the level 4 (L4) cache (not shown) and is in operable communication with an SC chip (not shown).

The data controller 305 includes intermediary controllers 401a, 401b, 401c, 401d that are respectively in operable communication with a processor 301a, 301b, 301c, 301d. Referring to FIG. 4, the intermediary controllers in some embodiments of the present invention are core fetch address register (CFAR) controllers 401a, 401b, 401c, 401d, that hold the memory address(es) of the requested data. The CFAR controllers 401a, 401b, 401c, 401d operate to manage requests from a respective processor 301a, 301b, 301c, 301d to L3 cache 306 or main memory 307. If there is a hit in the L3 cache 306, the CFAR controllers 401a, 401b, 401c, 401d manage the return of the data from the L3 cache 306 to the requesting processor(s) 301a, 301b, 301c, 301d. If in the event there is an L3 cache 306 miss, the CFAR controllers 401a, 401b, 401c, 401d manage the request to the main memory 307. The CFAR controllers 401a, 401b, 401c, 401d are in operable communication with a shared controller 402. In some embodiments of the present invention, the shared controller is a local fetch address register (LFAR) controller 402. The LFAR 402 manages data requests for the CFARs 401a, 401b, 401c, 401d accessing main memory. It should be appreciated that although FIG. 4 depicts CFAR and LFAR controllers, any number of types of controllers would suffice, in which multiple intermediary controllers for respective processors are in operable communication with the shared controller to retrieve memory from higher level cache and main memory.

In a conventional system, when a processor issues a data request to L3 cache, the address is loaded onto a CFAR. Address compare circuitry compares the address loaded onto the CFAR with any addresses of the requested data of other processors. If the address of the requested data matches the address requested by the issuing processor, the secondary CFAR controller remains in a hold position until the issuing processor releases the data. Any subsequent controller requesting the data will in turn also remain on hold until the cache line is available. Once the processor is completed, the requesting CFAR controller retrieves the data and transmits the data to it its associated processor. The subsequent CFARs controllers receive the data in a serialized fashion upon the order that the request was received. This results in ownership of the requests by the intermediary controllers and a serialized management of data returns.

In embodiments of the present system, the shared controller/LFAR controller 402 assumes ownership of the primary fetch and manages the secondary requests from multiple processors. As an example, a first processor 301a makes a request to fetch data and initially searches L1 cache 303a and L2 cache 304a. It should be appreciated that although the figures illustrate a first processor 301a making the request, the request can be made by any requesting agent. For example, the requesting agent includes a processor agent, a cache agent, or any other appropriate agent. If the requested data is not found in either cache, the CFAR controller 401a associated with the first core 302a initiates a request to fetch the data from a higher level memory to the LFAR controller 402. The LFAR performs an address compare to determine if the data is being used by another processor 301b, 301c, 30d. If the data is not being used, the LFAR controller 402 fetches the data and returns it to the first processor 301a.

If the first processor 301a is accessing the data for a write operation, the LFAR controller 402 uses a synchronization mechanism to lock out the other processors from accessing the data until the first processor 301a releases the data. An example of a synchronization mechanism is a mutex. A mutex is a mechanism that operates to enforce limits on access to a resource in a multi-thread environment. Therefore, even if two processors try to fetch the data at the same time, one of the cores will be blocked until the other one releases it. Another synchronization mechanism is a bus arbitrator, which permits only the first processor 301a to control a shared bus that links the first processor 301a and any connected processors.

If the first processor 301a is accessing the data for a read-only operation, the LFAR controller 402 transmits the data in parallel to any other processor 301b, 301c, 301d requesting the data for a read-only operation. Embodiments of the present invention permit the LFAR controller 402 to return the data in parallel to multiple processors or requesting agents. This improves resource utilization and processor stall times for the SMP.

In either a read-only operation or a write operation, the LFAR controller 402 periodically receives an address compare from a CFAR controller 401b, 401c, 401d (secondary requestor). If the LFAR controller 402 detects a request for the same data as requested by the first processor 301a, the LFAR controller 402 assumes ownership of each secondary request by storing the identity of the requesting one or more CFAR controllers 401b, 401c, 401d and the type of operation prompting the request. For example, the LFAR controller receives an exclusive fetch request from a second CFAR controller 301c followed by a read request from a third CFAR controller 301b. The LFAR controller 402 stores the identity of the requesting CFAR controllers 301b, 301c and the operation type in a queue, a table, or other appropriate data structure. Once the LFAR controller 402 has assumed ownership of the request, the requesting CFAR controllers 301 reset.

The LFAR controller 402 includes hardware operable for tracking and storing the identity of the secondary resource making the fetch request and the type of operation. In some embodiments of the present invention, the tracking mechanism is a queue configured to store an identity of the requesting resource and a time stamp of the requests. In these instances, the LFAR controller 402 returns the data to the requesting controllers sequentially based on the time stamp. In other embodiments of the present invention, the tracking mechanism stores the identity of the requesting controller and a priority of the operation. In these instances, the LFAR controller 402 returns the data in order of highest to lowest priority. In instances that the multiple processors share a bus, the LFAR controller 402 transmits the data to each of the processors through the bus at once. In yet even other embodiments of the present invention, the LFAR queue stores a combination of the above referenced characteristics and manages data returns based on the combination.

As part of the process, the LFAR controller 402 and the CFAR controllers 301a, 301b, 301c, 301d exchange information to establish that ownership of the secondary requests is the responsibility of the LFAR controller 402. The exchange of information includes the process of negotiation between two controllers and establishes the protocols prior to data transfer. As part of the exchange of information, the LFAR controller 402 and the CFAR controller 301a, 301b, 301c, 301d exchange tokens. The token from a CFAR controller 301a, 301b, 301c, 301d includes the identity of the CFAR controller 301a, 301b, 301c, 301d and the type of operation. The token from the LFAR controller 402 includes an acceptance acknowledging that the address of the requested data, the identity of the CFAR controller 301a, 301b, 301c, 301d, and the type of operation have been received. Upon receiving the token from the LFAR controller 402, the respective CFAR controller 301a, 301b, 301c, 301d resets and begins to request data for a new operation.

Figure 5:
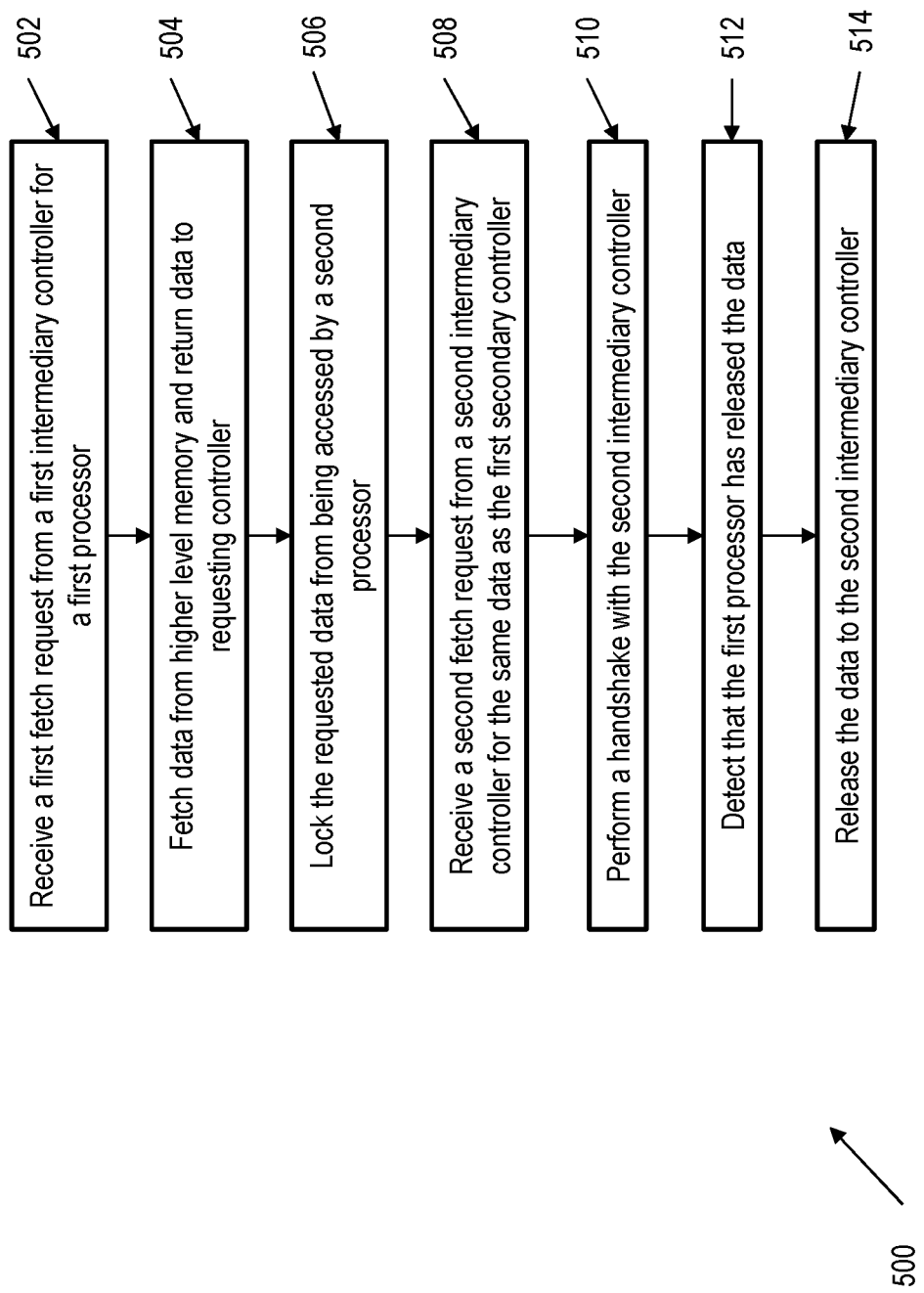
FIG. 5 depicts a flow diagram of a process for controller address contention assumption in accordance with one or more embodiments of the present invention.

FIG. 5 depicts a flow diagram of a computer-implemented method for controller address contention assumption according to one or more embodiments of the present invention. The method 500 includes a shared controller receiving a first fetch request by a first requesting agent by a first intermediary controller at block 502. The shared controller being in operable communication with multiple intermediary controllers. Each intermediary controller is in operable communication with a respective requesting agent. As described above in a non-limiting example, the requesting agents illustrated in the figures are processors. At block 504, the shared controller fetches the data from a higher level cache (for example L3 cache or L4 cache), alternate drawer, or main memory for the first requesting agent. At block 506, the shared controller uses a synchronization mechanism that locks the requested data from being accessed by any other requesting agent. The requested data is provided to the first requesting agent. At block 508, the shared controller receives a second fetch request from a second intermediary controller for the same data as the first intermediary controller.

At block 510, the shared controller performs a handshake with the second intermediary controller. During the handshake, the shared and intermediary controller exchange information including the identity of its requesting agent, the type of operation the data is requested for, and acknowledges of the exchange. By accepting the information from the second intermediary controller, the shared controller is accepting ownership of second intermediary controller's fetch request. This process continues as long as additional intermediary controller request the same data. At block 512, the shared controller recognizes that the first requesting agent has released the data. At block 514, the shared controller releases the data to the second requesting agent and any subsequent intermediary controller.

Figure 6:
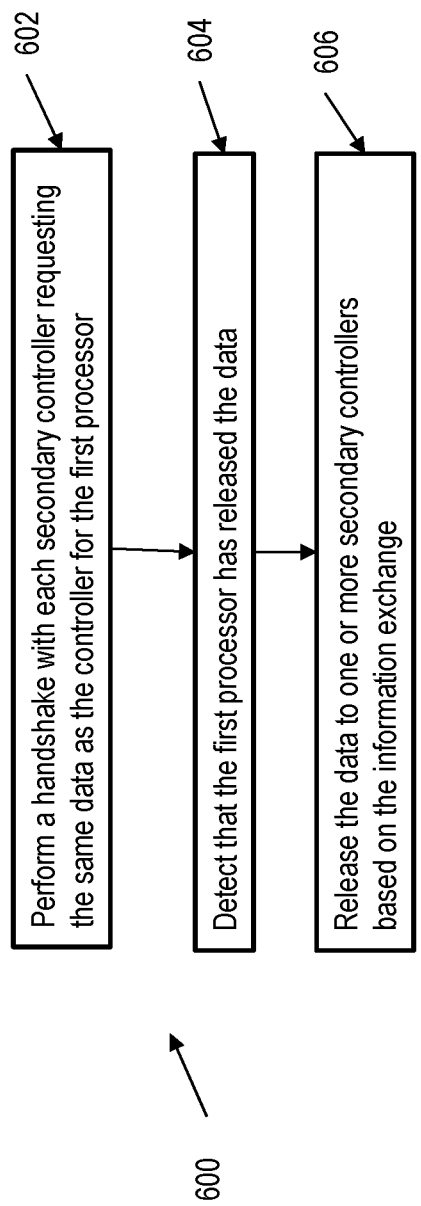
FIG. 6 depicts a flow diagram of a process for acknowledging ownership of a secondary request by a shared controller in accordance with one or more embodiments of the present invention.

FIG. 6 depicts a flow diagram 600 of a computer-implemented method for controller address contention assumption with multiple intermediary controllers according to one or more embodiments of the present invention. At block 602, the shared controller performs a handshake with each intermediary controller requesting the same data as the controller for the first requesting agent. The handshake includes information regarding the identity of each requesting agent, the type of operation that each secondary is requesting the data for, the priority of data, and an exchange of tokens between the shared controller and each intermediary controller. At block 604, the shared controller detects that the first requesting agent has released the requested data. At block 606, the shared controller releases the data to one or more secondary requesting agents based on the information exchange For example, when more than one controller is requesting the data for a read-only operation, the shared controller can release the data to each controller in parallel. The shared controller includes an estimator for estimating a length of time required for an operation. If, for example, one or more processors sequentially requested the data for a write operation prior to one or more processor requested the data for a read-only operation, the estimator of the shared controller can estimate that the time required to complete the read-only operation followed by the write operation is shorter than the write operation followed by the read-only operation. In this instance, the shared controller would transmit the data to the read-only processors, even though their request was subsequent in time to the write request processor. The estimation function is performed by various rules-based algorithms or historical data.

If the exchange information at block 602 revealed a priority of an operation, the shared controller would use a comparator circuitry to determine the highest priority operation. Based on the priority, the shared controller returns the data to the processor operating on the highest priority operations.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

As a result of the shared controller assuming response ownership of the fetches from the secondary requestors any intermediate controllers are enabled to reset instead of queuing up, which alleviates controller utilizations in critical processing areas. Due to ownership of the secondary requests being assumed by the shared controller, delayed resets, pipeline recycles, and other events that prolong operation restart timings are hindered. Additionally, the SMP system is enabled to optimize responses to secondary requests and data returns. For example, as the shared controller performs the reverse address compare, it knows each secondary requestor and can cause the data to be returning the concurrently to the secondary requestors. Additionally, a line of data can be converted to a shared state if multiple read requests have been issued for the line. Also, more efficient hot line passing is enabled within the group of requestors associated with the controller.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a shared controller, a fetch request for data from a first requesting agent, the receiving via at least one intermediary controller;
    performing, by the shared controller, an address compare using a memory address of the data;
    in response to the memory address matching a memory address stored in the shared controller, acknowledging, by the shared controller, the at least one intermediary controller's fetch request, wherein upon acknowledgement, the at least one intermediary controller resets, wherein the acknowledging comprises exchanging tokens by the shared controller and the at least one intermediary controller, wherein the at least one intermediary controller transmits an identity of the first requesting agent and a type of operation associated with the requested data, and wherein the shared controller transmits an acceptance.

2. The computer-implemented method of claim 1, the method further comprising:
    in response to release of the data by a second requesting agent, transmitting, by the shared controller, the data to the first requesting agent.

3. The computer-implemented method of claim 2, the at least one intermediary controller including a plurality of intermediary controllers, wherein the exchange of information further comprises a priority of an operation, and wherein the shared controller transmits the released data to a respective requesting agent of each intermediary controller of the plurality of intermediary controllers based on the respective priority.

4. The computer-implemented method of claim 2 further comprising:
storing, by the shared controller, the identity of the requesting agent and the type of operation in a queue.

5. The computer-implemented method of claim 1, the at least one intermediary controller including a plurality of intermediary controllers that each have a fetch request for a read-only operation of the data, wherein the shared controller transmits the released data to the respective requesting agents of the plurality of intermediary controllers in parallel.

6. The computer-implemented method of claim 1, the at least one intermediary controller including a plurality of intermediary controllers that each have a fetch request for a respective write operation of the data, wherein the shared controller sequentially transmits the released data to a respective requesting agent of each intermediary controller of the plurality of intermediary controllers based on a time of each fetch request.

7. The computer-implemented method of claim 1, the at least one intermediary controller including a plurality of intermediary controllers, wherein a first subset of the plurality of intermediary controllers each have a fetch request for a respective write operation of the data, wherein a second subset of the plurality of intermediary controllers each have a fetch request for a respective read-only operation of the data, the shared controller estimating a time of completion of the read-only operation being shorter than the write operation and transmitting the released data for requesting agents associated with second subset prior to requesting agents associated with the first subset.

8. A system comprising:
a memory having computer readable instructions; and one or more processors for executing the computer readable instructions, the computer readable instructions controlling the one or more processors to perform operations comprising:
receiving, by a shared controller, a fetch request for data from a first requesting agent, the receiving via at least one intermediary controller;
performing, by the shared controller, an address compare using a memory address of the data;
in response to the memory address matching a memory address stored in the shared controller, acknowledging, by the shared controller, the at least one intermediary controller's fetch request, wherein upon acknowledgement, the at least one intermediary controller resets, wherein the acknowledging comprises exchanging tokens by the shared controller and the at least one intermediary controller, wherein the at least one intermediary controller transmits an identity of the first requesting agent and a type of operation associated with the requested data, and wherein the shared controller transmits an acceptance.

9. The system of claim 8, wherein the operations further comprise:
in response to release of the data by a second requesting agent, transmitting, by the shared controller, the data to the first requesting agent.

10. The system of claim 9, the at least one intermediary controller including a plurality of intermediary controllers, wherein the exchange of information further comprises a priority of an operation, and wherein the shared controller transmits the data to a respective requesting agent of each intermediary controller of the plurality of intermediary controllers based on the respective priority.

11. The system of claim 9 further comprising:
storing, by the shared controller, the identity of the first requesting agent and the type of operation in a queue.

12. The system of claim 8, the at least one intermediary controller including a plurality of intermediary controllers that each have a fetch request for a read-only operation of the data, wherein the shared controller transmits the released data to the respective requesting agents of the plurality of intermediary controllers in parallel.

13. The system of claim 8, the at least one intermediary controller including a plurality of intermediary controllers that each have a fetch request for a respective write operation of the data, wherein the shared controller sequentially transmits the released data to a respective requesting agent of each intermediary controller of the plurality of intermediary controllers based on a time of each fetch request.

14. The system of claim 8, the at least one intermediary controller including a plurality of intermediary controllers, wherein a first subset of the plurality of intermediary controllers each have a fetch request for a respective write operation of the data, wherein a second subset of the plurality of intermediary controllers each have a fetch request for a respective read-only operation of the data, the shared controller estimating a time of completion of the read-only operation being shorter than the write operation and transmitting the released data to requesting agents associated with second subset prior to requesting agents associated with the first subset.

15. A computer program product comprising a computer readable storage medium having program instructions embodied therewith, the program instructions executable by a processor to cause the processor to perform operations comprising:
receiving, by a shared controller, a fetch request for data from a first requesting agent, the receiving via at least one intermediary controller;
performing, by the shared controller, an address compare using a memory address of the data;
in response to the memory address matching a memory address stored in the shared controller, acknowledging, by the shared controller, the at least one intermediary controller's fetch request, wherein upon acknowledgement, the at least one intermediary controller resets, wherein the acknowledging comprises exchanging tokens by the shared controller and the at least one intermediary controller, wherein the at least one intermediary controller transmits an identity of the first requesting agent and a type of operation associated with the requested data, and wherein the shared controller transmits an acceptance.

16. The computer program product of claim 15 wherein the operations further comprise:
in response to release of the data by a second requesting agent, transmitting, by the shared controller, the data to the first requesting agent.

17. The computer program product of claim 16, the at least one intermediary controller including a plurality of intermediary controllers, wherein the exchange of information further comprises a priority of an operation, and wherein the shared controller transmits the released data to a respective requesting agent of each intermediary controller of the plurality of intermediary controllers based on the respective priority.

18. The computer program product of claim 15, the at least one intermediary controller including a plurality of intermediary controllers that each have a fetch request for a read-only operation of the data, wherein the shared controller transmits the released data to the respective requesting agents of the plurality of intermediary controllers in parallel.

19. The computer program product of claim 15, the at least one intermediary controller including a plurality of intermediary controllers that each have a fetch request for a respective write operation of the data, wherein the shared controller sequentially transmits the released data to a respective requesting agent of each intermediary controller of the plurality of intermediary controllers based on a time of each fetch request.

20. The computer program product of claim 15, the at least one intermediary controller including a plurality of intermediary controllers, wherein a first subset of the plurality of intermediary controllers each have a fetch request for a respective write operation of the data, wherein a second subset of the plurality of intermediary controllers each have a fetch request for a respective read-only operation of the data, the shared controller estimating a time of completion of the read-only operation being shorter than the write operation and transmitting the released data to requesting agents associated with second subset prior to requesting agents associated with the first subset.

* * * * *